UNITED STATES PATENT OFFICE.

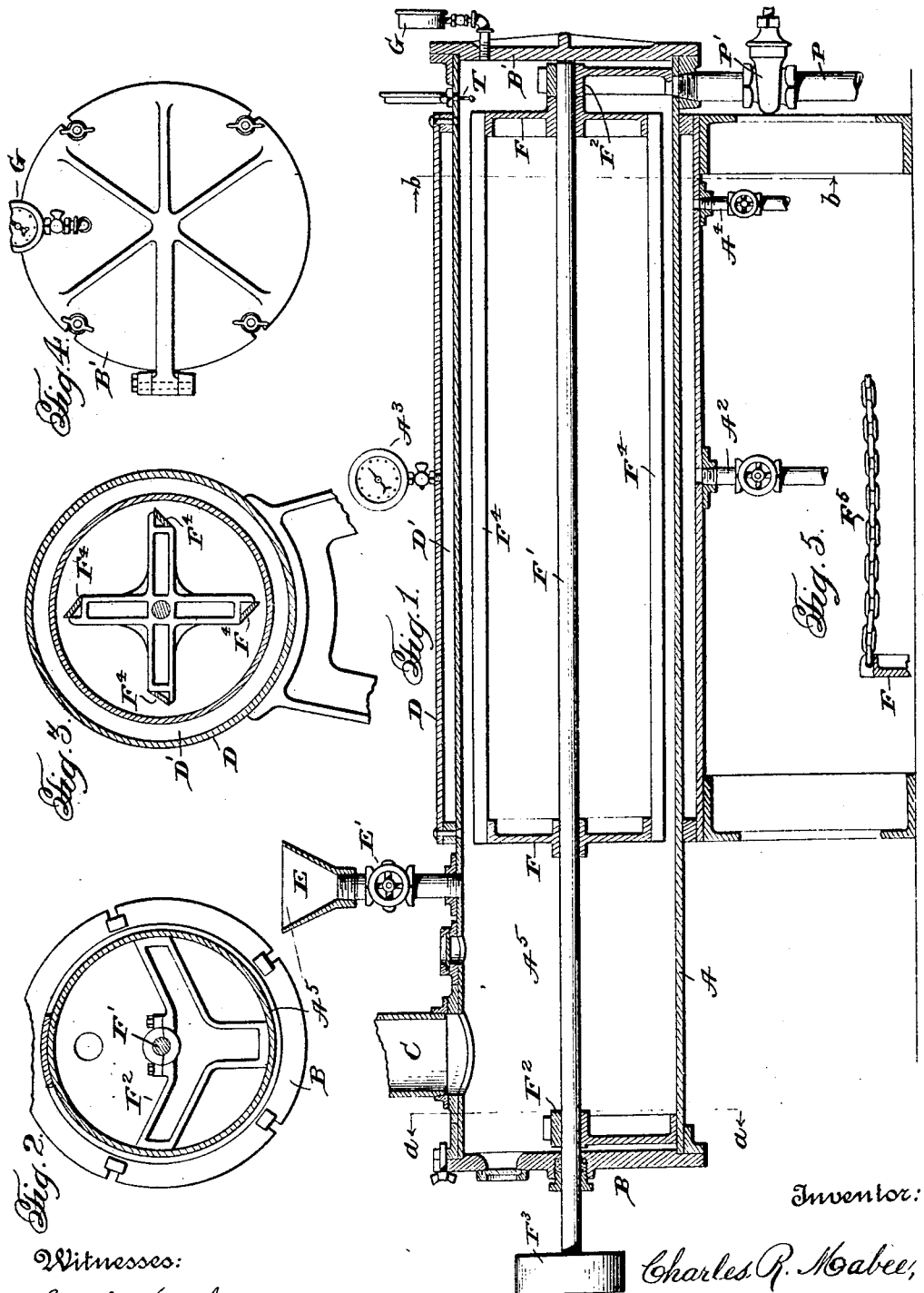

CHARLES R. MABEE, OF TOLEDO, OHIO.

METHOD OF EVAPORATION.

1,420,641.  Specification of Letters Patent.  Patented June 27, 1922.

Original application filed August 31, 1912, Serial No. 718,114. Divided and this application filed February 18, 1919. Serial No. 277,904.

*To all whom it may concern:*

Be it known that I, CHARLES R. MABEE, citizen of the United States, residing at Toledo, in the county of Lucas and State of Ohio, have invented certain new and useful Improvements in Methods of Evaporation, of which the following is a specification, reference being had therein to the accompanying drawing.

This invention relates to a method of evaporation, the present application being a division of my application Serial No. 718,114, filed August 31, 1912, entitled Centrifugal separator.

It is one of the objects of the invention to provide a simplified method or process for removing the water from milk, salt and sugar solutions, and other products.

Further objects are to provide a method making possible the utilization of a machine in which the container for the solution and substances to be affected and the heating surfaces and appliances can be easily cleaned and in which the amount of fuel required for heating purposes will be greatly reduced and the fuel can be made more effective.

Heretofore vacuum pans and other methods of removing water from solutions of various kinds have required the employment of skilled labor to operate them. The coils of tubing employed for heating the fluids have been enclosed within cylinders and have been difficult of access for repairs or cleaning. They have been expensive in construction and have required in the several systems a far greater amount of steam to evaporate a pound of water than is required to produce the same results by the method hereinafter described.

The improved method includes the application of centrifugal motion to separate the more solid products from the fluid and gaseous portion, and in connection therewith, the application of heat, and the maintenance of a partial vacuum to which the products are exposed, thus causing the evaporation of water from the solutions while in rapid motion, and at the same time constantly eliminating the vapor of evaporation from the solution by mechanical means and subjecting all minute particles of the solution to the reduced atmospheric pressure and constantly changing position of the particles constituting the solution.

The vapors and gases thus produced are conveyed out of the machine by means of a vacuum pump with condenser, pressure blower or exhaust fan.

In carrying out the method, it is proposed to provide an airtight tube or chamber in which a partial vacuum is maintained, and within which the materials to be treated are deposited and to heat a portion of the tube and throw outwardly the materials against the heated surface of the tube, maintaining them in the form of a thin film or coating thereon while rapidly moving circumferentially about the inner surface of the tube, and while the vapor or evaporation is mechanically separated from the solution and drawn from the central or axial portion of the tube.

In practicing the method, I conveniently make use of the combination and arrangement of parts and preferred forms of construction of the various details, as hereinafter described, shown in the accompanying drawings and specifically pointed out in the claims.

In the accompanying drawings Fig. 1 is a longitudinal central section of the device; Fig. 2 is a transverse section thereof on lines $a$—$a$ Fig. 1; Fig. 3 is a transverse section thereof on lines $b$—$b$ Fig. 1; Fig. 4 is an end elevation showing the closure for one end and vacuum gauge; Fig. 5 is a transverse section of a portion of a spider showing a chain employed to provide the centrifugal force required to throw the materials against the inside surface of the tube or chamber and by means of which the surface is kept bright and clean.

In these views A is the cylindrical tube or chamber provided with air tight heads or closures B, B' which may be detachable to form doors for access to the interior of the machine. C is an exhaust tube communicating with the chamber A through which vapors, gases and other products of evaporation are drawn from the chamber.

The necessary devices for exhausting the vapor of evaporation are made of any suitable type and hence need not be illustrated, but are operatively connected with the exhaust pipe C.

A steam jacket D encloses substantially two thirds of the length of the tube A providing an annular space D' into which steam is supplied through a pipe A². A pressure gauge A³ is also supplied to indicate the steam pressures and a drain cock is also provided as shown at A⁴.

The steam jacket is placed nearer one end of the tube A than the other, leaving an unenclosed portion A⁵ the object of which will be further described. The exhaust pipe C communicates with this end of the tube and a funnel or hopper E controlled by means of a valve E' is employed when introducing material into the tube A for treatment.

A thermometer T and vacuum gauge G are also shown attached to the other end of the tube A. A pipe P and valve P' are attached to the tube at the lower right end by means of which a liquid product such as milk is drawn off from the tube after treatment. F are spider arms spaced apart, and secured to a common shaft F' supported in bearings F", F" at each end of the machine, and rotated at a uniform rate of speed by means of a pulley F³ or other power operating means.

The outer ends of the spider arms are connected by means of suitable appliances for giving a centrifugal movement to the materials to be treated to throw them against the inner surface of the heated tube, and to give them a circumferential movement about the inner surface of the tube.

The appliances for moving the liquid may be blades F⁴ F⁴ as shown in Figs. 1 and 3 or they may be flexible appliances such as the chains shown in Fig. 5 at F⁵. The action of chains being to engage the surface when they are thrown out by centrifugal force and keep it clean and bright and prevent any deposit from remaining thereon.

The appliances which produce centrifugal movement in the liquid correspond in length with the length of the annular steam jacket and coincide in location therewith and the liquid in the unenclosed portion A⁵ of the tube is not lifted from the lower portion of the tube.

The blades F⁴ F⁴ are preferably inclined, so as to give an outward centrifugal force to the fluid in the tube and retain it in close contact with the interior surface of the tube, and the rear surface of each blade is preferably so designed as to obtain as large an opening as possible in the fluid behind the blade as it revolves, and hence provide an additional area subjected to reduced pressure and a larger surface to be affected by the reduced pressure within the tube caused by the vacuum pump, pressure blower or exhaust fan.

The manner in which the evaporation and drying of the material enclosed in the tube is obtained may be described as follows and may be illustrated by the treatment of milk with which the tube is charged. A vacuum of preferably 26 inches is maintained in the tube which is that ordinarily employed in upright vacuum pans.

The blades or chains are then rotated about 80 times per minute and lift and spread the milk in a film around the heating surface of the tube. This film absorbs the heat quickly from the jacket owing to the very large heating surface thereof, and the rapid passage of the film of milk thereover.

As the particles of the material under treatment change their location incessantly they are continuously subjected to the reduced atmospheric pressure in the interior of the tube which removes the vapor of evaporation as fast as it is generated by the heat, reduction of pressure and motion within the tube.

The heavier liquid is separated by the centrifugal force from the gaseous portions and lies more closely in contact with the surface of the tube, and the gaseous portions are quickly removed through the interior of the tube.

A film of superheated gases will be generated between the fluid constituting the film of liquid and the surface of the tube and be expelled from time to time, greatly accelerating the evaporation of the water from the solution.

When bodies such as the blades or chains pass rapidly through a liquid they carry with them an area of vapor and leave an open space behind them into which the partial vacuum enters and evaporation is greatly accelerated by this fact. The slight agitation caused by these devices does not affect the formation or maintenance of the film or layer.

The chains when used have the added function of flying outward so as to scrape upon the heating surfaces and to keep them clean and bright, and prevent the casein from sticking to these surfaces as would occur in the ordinary methods employed. This assists very much in keeping the machine in a sanitary condition.

I do not, however, herein claim cleansing devices, having presented claims to that subject-matter in my copending applications 40,757, filed July 19, 1915, and 77,996, filed February 12, 1916, and the claims presented herein relating to the method of sharply defining axially, both of the end parts of the food film or layer, that is, treating it between confining devices at the ends, which limits its elongation axially, while it is being maintained in film form, and with a large central opening for the reception of the vapor products, the container for the material to be treated in this apparatus being divided into unheated and heated portions.

The space A⁵ which is not enclosed by the steam jacket contains no revolving blades or chains, and hence the liquid is left quiet therein so that the vapors and gases can pass out of the exhaust opening without drawing foam or fine particles of liquid with them. It corresponds to the upper portion of an upright vacuum pan.

It is advantageous to convert the watery portion of the material, which contacts with the heating surface, at as low a temperature as possible; and if the temperature of such vapor drops a few degrees, as it tends to drop immediately on entering the vapor zone, it is again condensed into globules of water. The minute globules, though tending to be suspended, will, if not immediately drawn out from the vapor-collecting zone, contact again with the layer of material and again require heating and vaporizing.

The watery portion of the solution after the centrifugal and circumferential motions are maintained for a few minutes collects on the inner surface of the film where the action of the partial vacuum will have the greatest effect in evaporating and carrying it away, and this will be accomplished much more easily than if the vapor of evaporation were compelled to overcome the weight of the liquid before it could rise to the surface from the lower portion of an upright vacuum pan.

It has been ascertained by repeated tests that greater efficiency can be secured in the evaporation of fluids by removing the vapor of evaporation in a direction at right angles to the attraction of gravitation rather than in a direction in opposition to the attraction of gravitation which is the present method in use in vacuum systems.

When the vapor leaves the surface of a liquid in a vertical direction in the ordinary vacuum pans, where there is a depth of liquid of three or four feet and a considerable distance therefrom to the off take pipe, the upward motion is slow in the fluid and the upward movement against gravity after passing through the fluid is slow, and at low velocity some of the vapor will condense into globules and fall back again and it is necessary to reevaporate the same.

By the present method the vapor generates from the film of liquid and is drawn axially and horizontally through the tube and practically at right angles to the attraction of gravity, and hence has far less resistance to overcome from the effects of gravitation, and hence the economy in the use of heat units is greatly promoted.

The speed of evaporation of fluid contained in a vacuum chamber is greatly promoted by the depression below atmospheric pressure, so that water will boil in a vacuum of 26 inches at a temperature of 135°. The advantage of the phenomena in evaporating and drying milk or other delicate food stuffs is obvious, since the milk will not be chemically changed as would be the case if high temperatures were employed.

In the practice of the present method there is but little adhesion of the milk to the heating surface since the parts are in constant movement and the liquid operated upon is in the form of a film which passes rapidly over the heating surfaces. For this reason no cooked flavor or odor is imparted to the milk as in the employment of the upright vacuum pans heated from the bottom.

I have in other, co-pending, applications illustrated and described modified forms of evaporating or condensing apparatus, and modified methods of procedure in evaporating or condensing work.

In my original application No. 718,114, filed August 31, 1912, of which the present application is a division, I illustrated a mechanism having a cylinder, means for heating it, a rotary film-forming device, means for supplying material to and for allowing it to escape from the cylinder and for making the latter substantially closed when in operation, and a vacuum exhaust duct communicating with the cylinder; and in my application Serial No. 738,178, filed December 23, 1912, a similar though modified form of apparatus and method employed in carrying out the apparatus, is illustrated and described.

In application No. 805,598, filed December 9, 1913, I illustrated and described a modified mechanism of this general class; and in application 797,087 (of which said number 805,598 is a division), filed October 24, 1913, renewed as No. 108,956, I described and illustrated the method of procedure which is followed in using the last said apparatus, the subject matter of the applications last specified including the forming of the film or layer on the interior surface of the treating cylinder or tube, causing said film or layer to rapidly revolve circularly and also move axially and allowing free escape of the vapors direct to the open atmosphere.

In applications 40,757, filed July 19, 1915, and No. 77,996, filed February 12, 1916; respectively, I presented a modified mechanism and the method in which the same is used, these also involving film-forming devices of the class of those herein, adapted to produce a film or layer of the material on the interior surface of the heating cylinder and adapted to cause the movement of said film or layer circularly and longitudinally or axially, together with devices for cleaning and polishing the active surface of the container, and devices to remove gases, air, vapors, etc. (from the central axial or vapor zone surrounded by said film or layer), and project such gases and vapors through an exhaust duct rapidly by the use of suitable mechanism.

I do not herein claim any of the subjects matter presented by the claims in any of the said several co-pending applications.

Having described the invention what I claim as new and desire to secure by Letters Patent is:

1. The process of evaporating food substances such as milk, which consists in introducing the substance into one end of a container having a uniform tubular treating surface, subjecting said tubular treating surface to uniform heat at a temperature sufficient to evaporate liquid constituents of the material substantially from end to end thereof, maintaining within the container a partial vacuum subjecting the substance to the force of contacting rotatable conveyors and applying the same in a continuous circular thin film formation on said tubular treating surface, and causing the entire tubular film of substance to rotate over said surface, while maintaining a continuous substantially unobstructed interior vapor zone substantially free from the substance from end to end of the tubular treating surface, permitting the vapors to escape inwardly from the layer to the vapor space and rapidly through the vapor space from the container, and withdrawing the evaporated substance from the opposite end of the container.

2. The art of evaporating milk which consists in supplying the milk at one end of a cylindrical container, the inner surface of the peripheral wall of which constitutes a treating surface, causing the material to assume a thin circular layer formation throughout substantially the entire body of said layer which is in contact with said treating surface, subjecting said layer to positive, uniform and rapid movement under centrifugal force and pressure over the treating surface, subjecting the peripheral wall of the container to exterior uniform heat of a temperature sufficient to vaporize liquid constituents of the material, maintaining within the layer of material, and substantially from end to end of the heated surface a substantially unobstructed space substantially free from material other than escaping vapors, maintaining a substantial vacuum within the container, causing the vapors to continuously escape from the layer to the vapor space and from said vapor space to the outside of the container, and withdrawing the evaporated material from the opposite end of the container.

3. The method of treating a substance containing a liquid to change its consistency, it consisting in introducing into a heated container of circular cross section an amount of the substance sufficient to form on the heated wall of the container a relatively thin stratum or layer which surrounds an open axial cylindrical chamber of relatively large diameter, subjecting the said chamber to the action of a positive exhaust while the interior of the container is cut off from the atmosphere, forcing the liquid substance outward centrifugally towards the heated wall to form such stratum, positively moving the stratum circularly over the surface of the container, causing the centrifugal action of the liquid to rapidly force inward relatively large volumes of vapor through the stratum and into said exhaust chamber and then immediately withdrawing said vapor volumes from the end of the layer through a relatively wide escape opening which is in the transverse planes of the end of the stratum and having a cross area approximity equal to that of said chamber.

4. The method of condensing a fluid containing a vaporizable component which consists in heating a tubular container, supplying the fluid to the interior of the container at one end thereof, forming of said fluid a relatively thin layer with an outer surface approximately circular in cross section, and contacting with the heated interior surface of the container, causing the particles composing the said layer to be forced radially outward, vaporizing the fluid component by the heat from the surface of the container, causing the vapors generated at said surface to be forced inward toward the axis of said layer, maintaining a vapor-receiving space around said axis and throughout the length of the layer, subjecting the said space to the action of exhaust while the interior of the container is cut off from the external atmosphere, permitting the escape of vapors under the influence of said exhaust through a passage of relatively large area at said axis, and withdrawing the condensed residue of fluid substance from the end of the container opposite to the end where the fluid is supplied.

5. The method of condensing a fluid containing a vaporizing component which consists in heating a tubular container circular in cross section, introducing into said container an amount of the fluid sufficient to form on the heated wall thereof a relatively thin stratum which surrounds an open axial cylindrical chamber of relatively large diameter, subjecting the said axial chamber to the action of a positive exhaust, forcing the liquid substance outward centrifugally toward the heated container wall to form such stratum, causing the centrifugal action of the liquid to force relatively large volumes of vapor through the stratum inward into the exhaust chamber, withdrawing the vapor volume from the heating region through a relatively wide escape opening at the end of the heating region and of a cross area approximately equal to that of the axial chamber into an adjacent chamber and then to an exhaust duct, and withdrawing the condensed residue of fluid substance from the end of the container opposite to the end where the fluid is supplied.

6. The method of treating a substance containing a liquid to change its consistency, it consisting in introducing into a heated container of circular cross section a quantity of the substance sufficient to form on the heated wall thereof a stratum surrounding an open axial chamber of relatively large diameter, forcing the substance outward centrifugally toward said wall to form such stratum, positively moving the stratum circularly over the surface of the container, causing the centrifugal action of the liquid to rapidly force relatively large volumes of vapor inward into said axial chamber, withdrawing said vapor volumes from the axial chamber on lines parallel to the axis through a relatively wide escape passage at one end of the layer and of cross area approximating the cross area of the said axial chamber.

7. The art of treating a substance containing liquid to change the consistency thereof which consists in applying to the inner surface of a substantially cylindrical container a continuous circular layer of material of substantially uniform thickness, subjecting said container to external heat whereby to vaporize liquid constituents of the material, causing a relatively rapid rotatable movement between the layer of material and the container, maintaining a central zone within the layer of material for the escape of vapors and gases, allowing said vapors or gases to freely escape from the container, and subjecting the particles of material to separation and agitation without destroying the layer formation of the body of material.

8. The process of evaporating food substances such as milk which consists in supplying the material to the interior of an adjacent one end of a substantially continuous unbroken cylindrical treating surface, subjecting the material to contacting rotatable conveyors whereby the material is applied in the form of a circular tube and subjected as a body to rotary movement under force in contact with said surface, while there is maintained a continuous internal vapor zone of substantially the same area from end to end of the cylindrical treating surface, subjecting the exterior wall of the cylindrical treating surface to uniform heat sufficient to vaporize liquid constituents of the material from end to end of said surface and permitting the vapors to escape from the material from end to end of said surface into said vapor space, allowing said vapors to escape from said space to the outside of the container, and finally withdrawing the evaporated material from the opposite end of the container.

9. The art of treating a substance containing liquid for changing its consistency, consisting in introducing a volume of the substance into a treating container of circular cross-section, causing the material to assume the form of a thin layer substantially uniform throughout the treating surface, maintaining the layer formation throughout treatment, rapidly moving the layer over the treating surface, heating the treating surface to cause a rapid evaporation of the liquid, and permitting the gases and vapors to escape inwardly from the layer and to freely escape from the container.

10. The method of evaporating milk, comprising causing said milk to move circularly on the interior of a cylindrical exteriorly uniformly heated surface to form a layer on the interior thereof, maintaining a continuous tubular layer of said milk on the cylindrical heated surface, effecting approximately uniform treatment of the milk throughout its contact with the heated surface by constantly throwing the cooler portions of the milk against the entire extent of the cylindrical heated surface, withdrawing vapors from the entire extent of the layer by allowing the vapor to be released from the layer into the milk-lined central space throughout a milk surface area, approximating the heated surface area, and continuously removing vapor from said central space.

11. The method of treating substance containing liquid to change its consistency consisting in introducing the substance into a horizontally disposed tubular container at one end thereof, imparting to the substance while in the container a rapid circulating movement over the surface of the container in layer form, maintaining the layer formation throughout the treatment, heating the walls of the container, and permitting the generated vapors to pass from the layer toward the center of the container and from thence out of the container.

12. The method herein described of quickly condensing the volume of a fluid by evaporation, which consists in subjecting a layer of the fluid material to uninterrupted, continuous rotary movement under pressure over the inner surface of a horizontally arranged heated tube, maintaining a central unobstructed quiet zone within said layer, and removing the separated vapor volumes along horizontal paths from the quiet zone on lines at right angles to the direction of gravitation.

In testimony whereof I hereunto affix my signature in the presence of two witnesses.

CHARLES R. MABEE.

Witnesses:
C. A. DANIA,
C. O. LIDOW.